United States Patent
Wei et al.

(10) Patent No.: US 6,608,917 B1
(45) Date of Patent: Aug. 19, 2003

(54) DETECTION OF VERTEBRA ENDPLATES IN DIGITAL RADIOGRAPHY

(75) Inventors: Guo-Qing Wei, Plainsboro, NJ (US); Jianzhong Qian, Princeton Junction, NJ (US)

(73) Assignee: Siemens Corporate Research, Inc., Princeton, NJ (US)

( * ) Notice: Subject to any disclaimer, the term of this patent is extended or adjusted under 35 U.S.C. 154(b) by 509 days.

(21) Appl. No.: 09/638,123

(22) Filed: Aug. 14, 2000

(51) Int. Cl.[7] .................................................. G06K 9/00
(52) U.S. Cl. ...................................... 382/132; 382/173
(58) Field of Search .............................. 382/128, 132, 382/173, 190, 195; 128/922

(56) References Cited

U.S. PATENT DOCUMENTS 5,982,916 A  * 11/1999  Kuhn ......................... 382/132
6,249,590 B1 *  6/2001  Young et al. ............... 382/103

OTHER PUBLICATIONS

Tascini et al., "Automatic Quantitative Analysis of Lumbar Bone Radiographs," Proceedings of the 1993 IEEE Nuclear Science Symposium & Medical Imaging Conference, vol. 3, pp. 1722–1726, San Fransisco, CA, Oct. 30–Nov. 6, 1993.*

Verdonck et al. "Computer Assisted Quatitative Analysis of Deformities of the Human Spine," Proceedings of Medical Image Computing and Computer–Assisted Intervention, pp. 821–831, Cambridge, MA, Oct. 11–13, 1998.*

* cited by examiner

*Primary Examiner*—Brian Werner
*Assistant Examiner*—Ryan J. Miller
(74) *Attorney, Agent, or Firm*—Donald B. Paschburg; F. Chau & Associates, LLP

(57) ABSTRACT

A fully automatic system and method for detecting endplates of vertebra in radiographic images, in accordance with the present invention, provides an intensity curvature map of an image of a spine and filters the intensity curvature map in a direction relative to a spine axis. At a plurality of points of the spine axis, maximum and minimum scores are computed by summing curvatures of the intensity curvature map and by summing directional intensity gradients along line segments to determine if an endplate passes through the points. Endplate positions are found by comparing relative positions of plotted values corresponding to the maximum and minimum scores.

23 Claims, 4 Drawing Sheets

DETECTION OF VERTEBRA ENDPLATES IN DIGITAL RADIOGRAPHY

BACKGROUND

1. Technical Field

This disclosure relates to radiographic imaging, and more particularly, to a system and method for detecting vertebra endplates in radiographic images.

2. Description of the Related Art

With the development of digital imaging technologies, the interest in using computers for assisting deformity analysis of scoliotic spines in radiography is increasing. Currently, most of these measurements are manually made. Manual measurement is not only time-consuming, but also subject to errors depending on the person's skill, experience and other human factors. Spine position information is obtained through X-rays of the spine. This information may be employed not only for deformity measurement of the spine itself but also as a reference position used for deformity quantification or measurements for many other anatomic landmarks.

Vertebra endplates are one important anatomical feature of the spine, which may be employed to quantitatively analyze and diagnose the spine. Vertebra endplate detection is difficult to automate for several reasons. For example, some vertebrae may appear dark, others bright, and some vertebra may appear obscured by other organs because of different imaging conditions and disease status. As a result, methods based on evidence provided by individual vertebrae may become unreliable.

Therefore, a need exists for an automatic system and method for detection of vertebra endplates for quantitative analysis and diagnosis. A further need exists for a system and method for determining the orientations of these endplates in radiographic images.

SUMMARY OF THE INVENTION

A method for detecting endplates of vertebra, in accordance with the present invention, provides an intensity curvature map of an image of a spine and filters the intensity curvature map in a direction relative to a spine axis. At a plurality of points of the spine axis, maximum and minimum scores are computed by summing curvatures of the intensity curvature map along line segments to determine if an endplate passes through the points. Endplate positions are found by comparing relative positions of plotted values corresponding to the maximum and minimum scores.

Another method for detecting endplates of vertebra, includes the steps of providing an image of a spine, providing an intensity curvature map of the image of a spine, filtering the intensity curvature map in a direction orthogonal to a spine axis, at a plurality of points of the spine axis, computing maximum and minimum scores by summing curvatures of the intensity curvature map and by summing directional intensity gradients along line segments to determine if an endplate passes through the points, performing an intensity gradient projection by determining an intensity gradient on the image of the spine in a direction orthogonal to line segments having maximum scores and determining endplate positions and orientations by employing relative positions of plotted values corresponding to the maximum and minimum scores and the intensity gradient projection.

In other methods, the step of performing an intensity gradient projection by determining an intensity gradient on the image of the spine in a direction orthogonal to line segments having maximum scores may be included. The step of performing an intensity gradient projection may include employing the intensity gradient projection to determine if the endplates are an upper endplate or a lower endplate. The step of computing maximum and minimum scores includes the steps of modeling an endplate by employing a line segment between spine boundaries, computing a co-linearity fit between the line segment and the intensity curvature map at a plurality of angular increments and computing scores as a sum of curvatures along each line segment. The method may include the step of confirming positions of the endplates by employing information about vertebra shapes.

In still other methods, the information about vertebra shapes may include, heights of vertebra and heights of inter-vertebral disks. The step of determining if endplate positions are found by comparing relative positions of peak values corresponding to the maximum and minimum scores, may include providing a score function which considers minimum and maximum scores and relative positions of the peak values corresponding to the maximum and minimum scores, and determining a maximum score in accordance with the score function to determine the endplates positions. The step of superimposing endplate images on the image of the spine may also be included. The methods of the present invention may be implemented by a program storage device readable by machine, tangibly embodying a program of instructions executable by the machine to perform the method steps.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein.

DETAILED DESCRIPTION OF PREFERRED EMBODIMENTS

The present invention provides automatic detection of vertebra endplates for measuring Cobb's angle, wedge angles, and tilt angles, which may be employed in, for example, deformity analysis of pathological spines in digital radiography. The automatic detection makes automatic measurement and quantification possible for both diagnosis purposes and surgery planning.

The invention provides an evidentiary reasoning approach to detect endplates. Local evidence of different kinds are first derived. This information is then combined, together with some global constraints, to derive a consistent and robust detection method and system. Gaps, such as those resulting from weak endplate edges, can be filled in automatically, whereas conflicts among pieces of local evidence are resolved by a top-down method using general knowledge of vertebra shapes.

Endplates are one important anatomical feature used in deformity analysis of spines by radiologists. The present invention defines and computes different kinds of local evidence about the presence of an endplate at an image point. This evidence is then combined with some prior knowledge about vertebra shape to provide physicians with an objective and accurate tool for making diagnostic measurement and pre-surgery planning, for example.

Although this disclosure employs the illustrative example of spine position, the methods and system described herein may be employed for tracking and defining other anatomical features, structures or organs. For example, the detection method of the present invention may be employed for planning surgical procedures for setting fractured or broken bones.

Figure 1A:
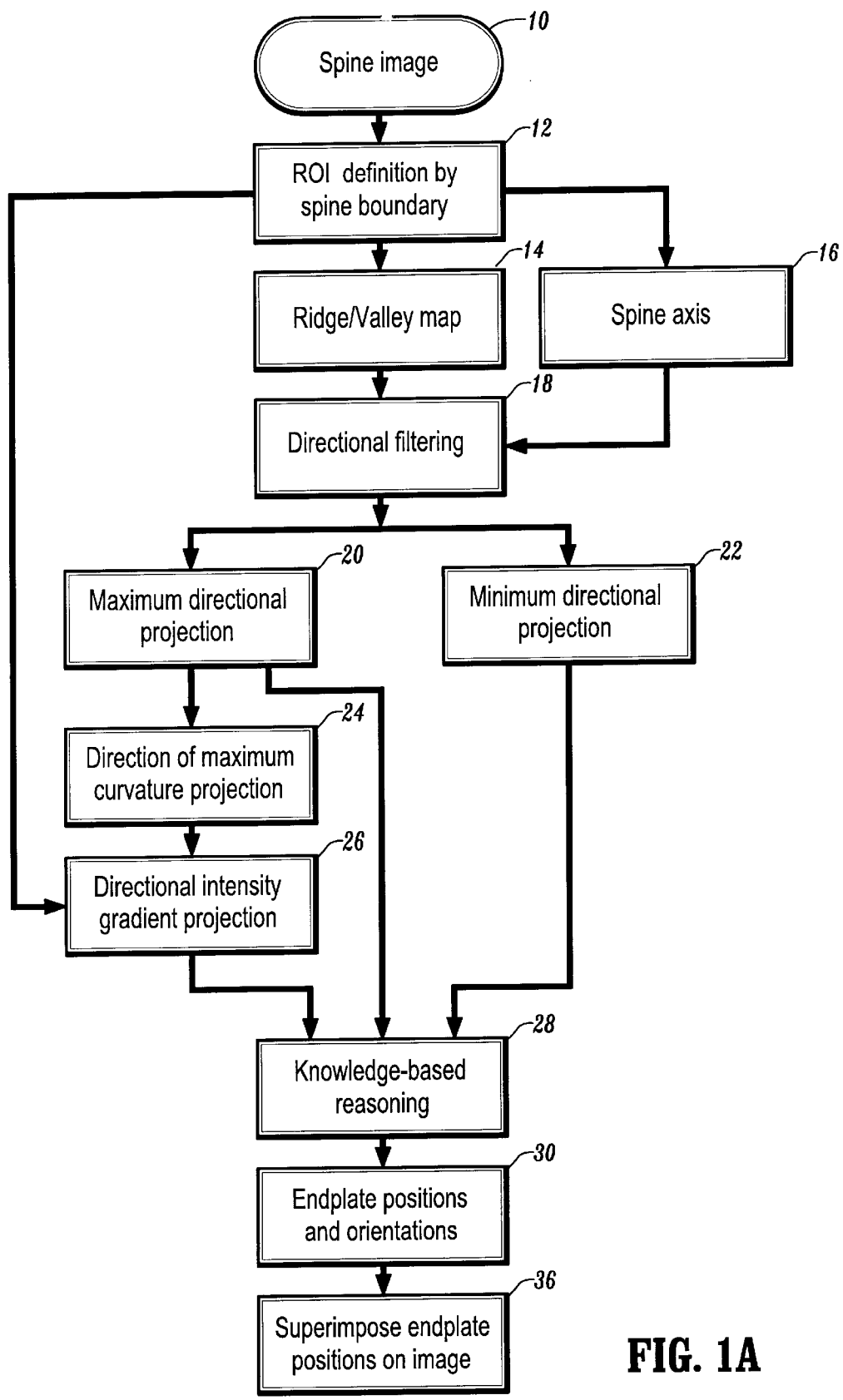
FIG. 1A is a block/flow diagram showing a system/method for detecting endplate positions and orientations in accordance with the present invention.
Figure 1B:
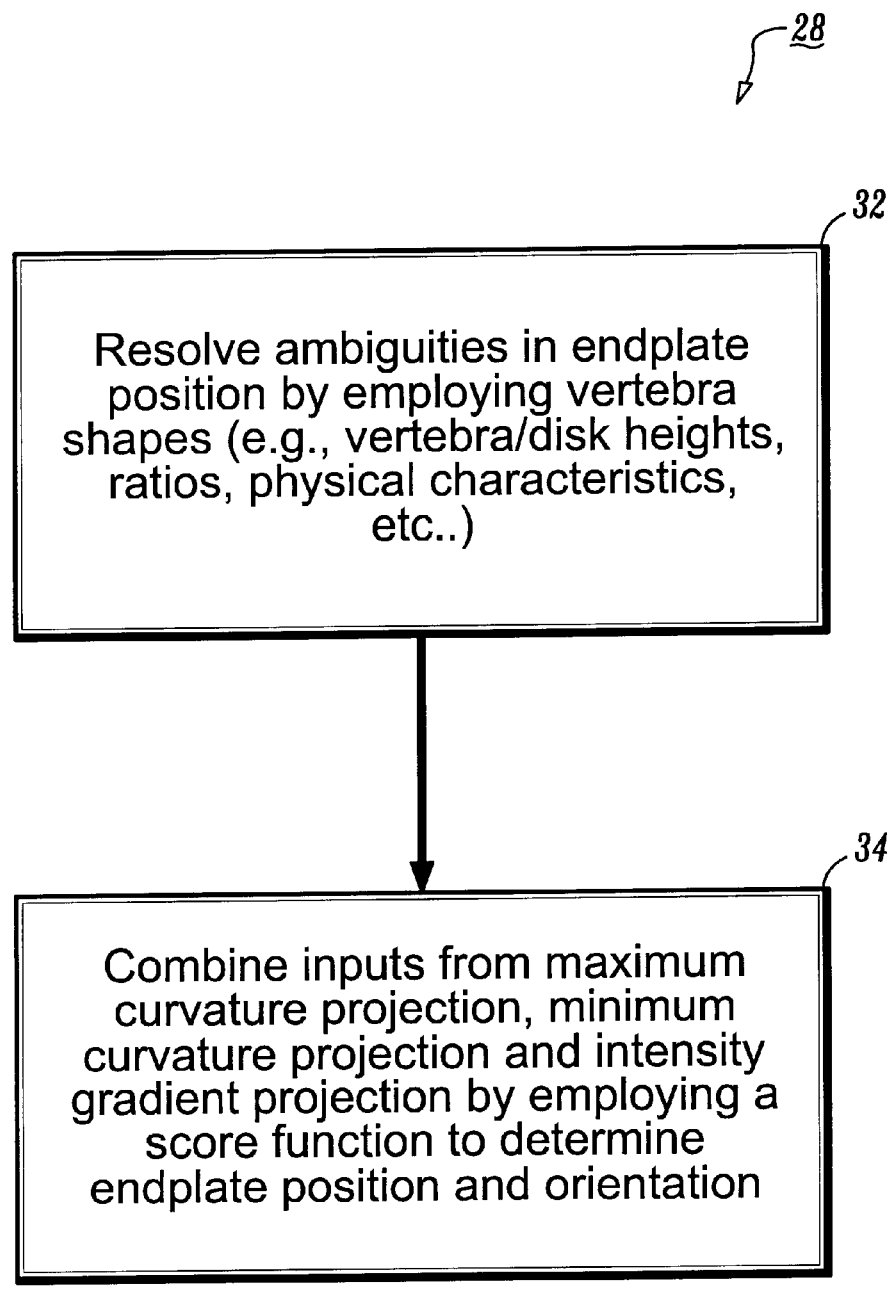
FIG. 1B is a block/flow diagram for knowledge based reasoning in accordance with the present invention.

It should be understood that the elements shown in FIGS. 1A and 1B may be implemented in various forms of hardware, software or combinations thereof. Preferably, these elements are implemented on one or more appropriately programmed general purpose digital computers having a processor and memory and input/output interfaces.

Figure 2:
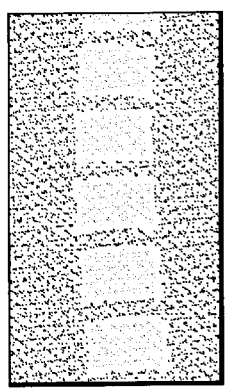
FIG. 2 depicts an image of a spine to be analyzed in accordance with the present invention.

Referring now in specific detail to the drawings in which like reference numerals identify similar or identical elements throughout the several views, and initially to FIG. 1A, a block/flow diagram for a system/method for detecting endplate positions is illustratively shown. In block 10, a spine image is provided, in which endplate orientations are desired. The image, in this example, includes an image of a spine taken by X-ray or other imaging technologies, such as computerized axial tomography (e.g., CAT scan), sonogram, magnetic resonance (MRI) or other techniques. The image is preferably converted to or taken in digital form. FIG. 2 is an example of a spine image, which may be provided as input to the endplate detection system of the present invention.

In block 12, a region-of-interest (ROI) is defined, for example, based on boundaries of the spine. The detection is preferably confined to the spine boundary and may be performed by analyzing the image of the spine.

Figure 3:
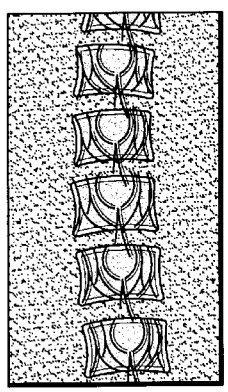
FIG. 3 depicts an image of an extreme curvature map of the spine image of FIG. 2 in accordance with the present invention.

In block 14, ridge/valley maps are determined for the ROI of a spine. From the spine image, an intensity curvature extreme map (ridge/valley maps) and the associated orientation map are computed. The ridge map computation is based on the second order derivatives of the intensity image in the horizontal, vertical and/or diagonal directions. The direction value of the ridge map at a pixel is the maximum curvature of the intensity profiles across that pixel in all directions. The direction which the curvature achieves the maximum is recorded for each pixel. This forms the orientation map. For example, suppose there is a white line in a dark background. For pixels one the white line, the curvature achieves a maximum in the direction orthogonal to the line orientation. The value of the maximum curvature is the value in the curvature extreme map and the orientation (orthogonal to the line) is the value in the orientation map. FIG. 3 illustratively shows an intensity curvature extreme map of the spine image of FIG. 2. One piece of evidence about endplate presence is that endplates usually appear as brighter lines (positive curvatures or ridges) in the curvature extreme map.

In block 16, a spine axis is determined. The axis may be determined by using the spine boundaries or by estimating the spine axis position.

Figure 4:
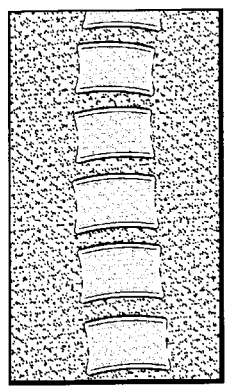
FIG. 4 depicts an image of a filtered extreme curvature map of the image of FIG. 3 in accordance with the present invention.

In block 18, directional filtering is performed. From the spine axis determined in block 16, a curvature extreme map is filtered so that only ridges/valleys nearly orthogonal to the spine axis are kept. This filtering is based on the knowledge that endplates are in an almost orthogonal direction to the spine axis. FIG. 4 shows the result of directional filtering to highlight lines orthogonal to the spine axis.

Figure 5:
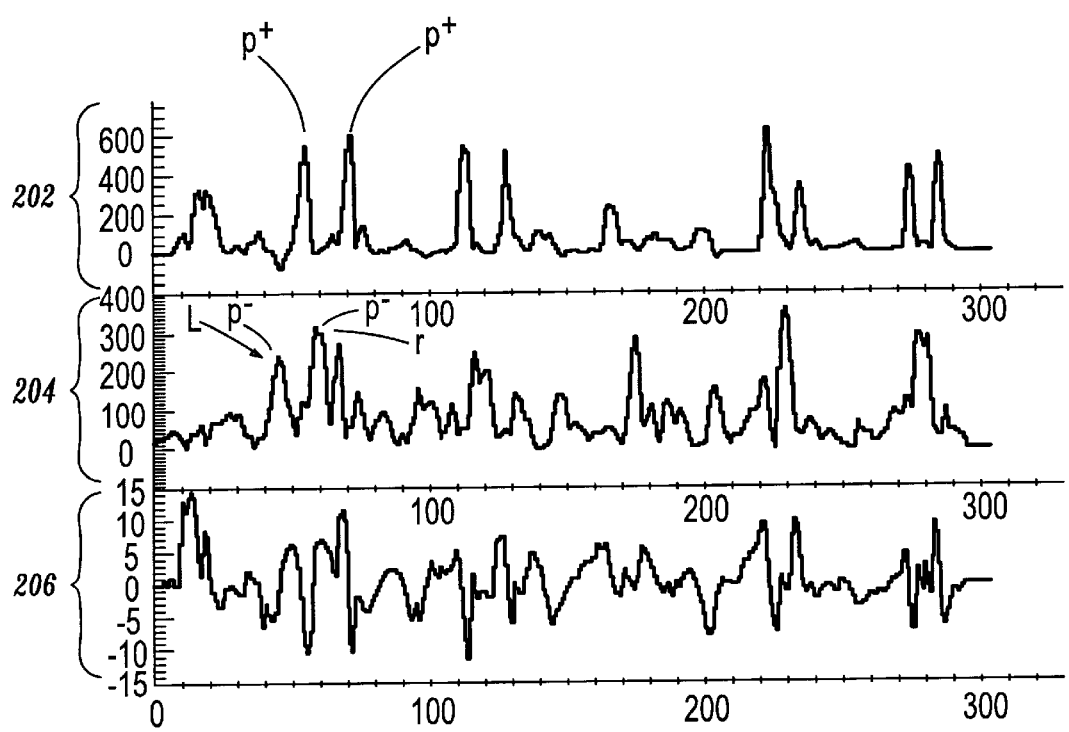
FIG. 5 shows plots of maximum curvature projection (202), minimum curvature projection (204) and directional intensity gradient projection (206) in accordance with the present invention.

In block 20, for each point P on the spine axis, compute a score, called the maximum directional curvature projection, which reflects the probability of having an endplate passing through that point. To do this, a line segment is used to model an endplate, with the endplate width equal to the distance between the left and right boundaries of the spine. Within a predefined range of angles around the orthogonal line to the spine axis at P, compute a co-linearity fit to the curvature map in each increment of a pre-specified angle-step. A score is computed as the sum of the curvatures along the segment at that orientation. Outliers are excluded to prevent single points of large curvature from producing a large score. The maximum of the scores is chosen as the maximum curvature projection at P. As shown in FIG. 5, a first plot 202 shows a maximum curvature projection for the image of FIG. 3. Endplates produce peaks in the maximum curvature projection.

In block 22, a minimum directional curvature projection is obtained similarly (for points P) as the maximum curvature projection. Instead of picking the maximum of scores, the minimum is chosen. The idea behind the use of minimum curvature projection is that there is a valley between two endplates of immediately neighboring vertebrae.

In FIG. 5, a second plot 204 shows a minimum curvature projection (multiplied by −1 to show peaks), where the peaks represent possible positions of intervertebral disks, which separate two consecutive vertebrae. In positions where evidence about the presence of endplates is weak in the maximum curvature projection, it may be strong in the minimum curvature projection. The minimum curvature projection does not tell the exact location of an endplate; however, it provides information about the approximate positions of two endplates.

Each endplate may produce a peak in the maximum curvature projection. But the peak alone does not tell whether it is a lower endplate or a upper endplate. The peaks in the minimum curvature projection help to resolve this ambiguity, but if the peaks in the minimum curvature projection are weak, other evidence needs to be gathered to make a decision. In blocks 24 and 26, an intensity gradient projection serves as this complementary source of information. In block 26, the intensity gradient projection is computed as a sum of a directional gradient in a direction orthogonal to the direction in which the maximum score is achieved in the maximum curvature projection or the direction of maximum curvature projection (block 24). Then, for the upper endplate of a vertebra, there is usually a significant valley of negative values between the peak position in the maximum curvature projection and the peak position in the minimum curvature projection, i.e., an intensity transition from bright to dark. For the lower endplate of a vertebra, there is usually a significant peak of positive value between the peak position in the maximum curvature projection and the peak position in the minimum curvature projection, i.e., an intensity transition from dark to bright. This information is employed to determine upper and lower endplates of the vertebrae.

Figure 6:
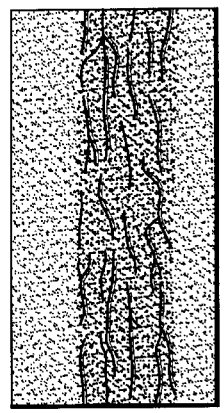
FIG. 6 depicts an image of a horizontal gradient computed for intensity gradient projection in accordance with the present invention.
Figure 7:
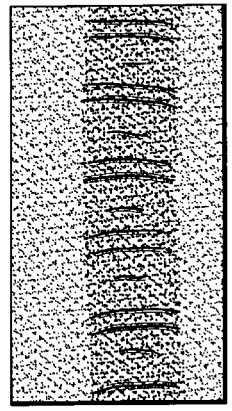
FIG. 7 depicts an image of a vertical gradient computed for directional intensity gradient projection in accordance with the present invention.

As shown in FIG. 5, a third plot 206 shows the intensity gradient projection computed from horizontal and vertical gradient components shown in FIGS. 6 and 7, respectively. FIGS. 6 and 7 are plots showing gradients or changes in intensity in the horizontal and vertical directions, respectively, derived form the region of interest determined in block 12. Plot 206 shows this intensity versus position, and is employed to provide evidence of upper or lower plate characteristics as described above.

The multiple evidence sources provide the basis for the decision-making about the presence of an endplate in block 28. Block 28 of FIG. 1A is shown in greater detail in FIG. 1B. Referring to FIG. 1B, the evidence, up until now, has been local and may not be strong enough to support a unique decision. Therefore, knowledge about the vertebra shape is used to resolve the remaining ambiguities in a top-to-bottom manner, in block 32. This may include:

a) height ratios with neighboring vertebrae are within a certain range;
b) the ratio of the thickness of the inter-vertebral disk to the vertebra height is within a certain range;
c) the heights of vertebrae may be known to be within a certain range; and
d) the thickness of inter-vertebral disk may be known to be within a certain range (as a result of item (b) and item (c) above). Other criteria may also be employed.

In block 34, a score function combining the multiple evidence is computed. For each peak position (e.g., $p^+$) in the maximum curvature projection illustratively shown in FIG. 5, plot 202, find the left peak and right peak in the minimum curvature projection (l and r, respectively), which would be adjacent to peak $p^+$ if plot 202 and 204 were superimposed. Suppose $\lambda d$ is the maximum thickness of an inter-vertebral disk (which is more precisely the distance between the upper endplate of a vertebra and the lower endplate of the immediate upper (adjacent) vertebra). Then, two scores may be computed: 1) supporting a lower endplate score. This is computed as the multiplication of the peak value in the maximum curvature projection at $p^+$, the maximum peak value in minimum curvature projection in the range $[p^+-\lambda d, p^+]$, and the maximum value in the gradient projection in the range $[p^+-\lambda d, p^+]$;

2) supporting an upper endplate: This is computed as the multiplication of the peak value in the maximum curvature projection at $p^+$, the maximum peak value in minimum curvature projection in the range $[p^+, p^++\lambda d,]$, and the minimum peak value (i.e., the most negative value) in the gradient projection in the range $[p^+, p^++\lambda d]$.

A second set of scores may be computed similarly for peak positions in the maximum curvature projection, but the search starts with each peak position $p^{31}$ in the minimum curvature projection. The reason for introducing this set of scores is that a peak in the maximum curvature projection may be supported by multiple peaks in the minimum curvature projection. Thus, for each peak position $p^-$ in the minimum curvature projection:

1) find the peak in the maximum curvature projection in the range $[p^--\lambda d, p^-]$ The score, which supports the premise that the peak is an upper endplate, is the maximum of the multiplication of the peak value with the peak value at $p^-$ in the minimum curvature projection and the minimum peak value in the gradient projection in the range $[p^--\lambda d, p^-]$; and 2) find the peak in the maximum curvature projection in the range $[p^-, p^-+\lambda d]$. The score, which supports the premise that the peak is a lower endplate, is the maximum of the multiplication of the peak value with the peak value at $p^-$ in the minimum curvature projection and the maximum peak value in the gradient projection in the range $[p^-, p^-+\lambda d]$.

Figure 8:
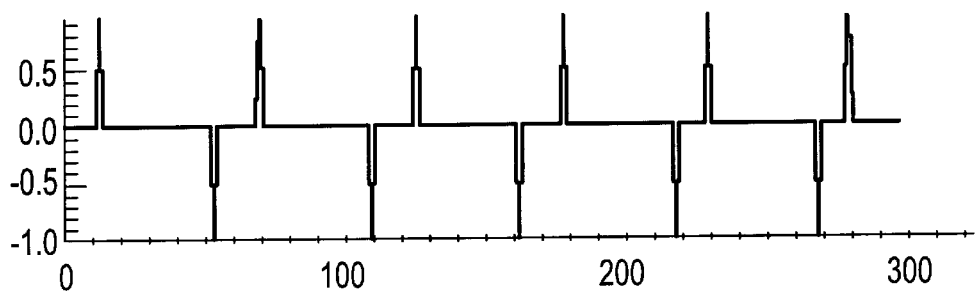
FIG. 8 shows a plot of results of knowledge-based reasoning indicating upper endplates (negative peaks) and lower endplates (positive peaks)

One goal of a knowledge-based reasoning is to pick up an endplate pair (i.e., the upper endplate of a vertebra and the lower endplate of the immediate upper vertebra) so that the score of the endplate pair, computed as the sum of each individual endplate's score, are maximized while satisfying all conditions set by the prior knowledge about the vertebra shape. In block 30 (FIG. 1A), the best scores provide the endplate positions and orientations. As shown in FIG. 8, the results of this reasoning, where the negative peaks represent upper endplates, and positive peaks represent lower endplates are shown.

Figure 9:
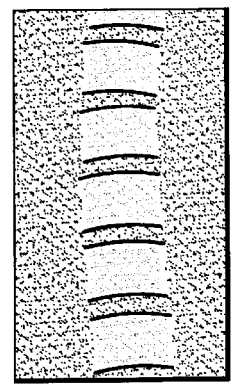
FIG. 9 depicts the spine image of FIG. 2 with endplate segments superimposed thereon in accordance with the present invention.

In block 36, the detected endplates positions may be superimposed with the original image of FIG. 2 as shown in FIG. 9. In FIG. 9, the input image is overlaid with the detected endplates (black lines) in accordance with the present invention.

The detected endplates can be used to compute the wedge angle and tilt angle of any vertebra as well as the Cobb angle. All of these angles are important measurements in the deformity analysis of spines, upon which physicians rely to make decisions about diagnosis or surgical planning. Other uses are also contemplated for the present invention.

Having described preferred embodiments for detection of vertebra endplates in digital radiography (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for detecting endplates of vertebra, comprising the steps of:

providing an intensity curvature map of an image of a spine;

filtering the intensity curvature map in a direction relative to a spine axis;

at a plurality of points of the spine axis, computing maximum and minimum scores by summing curvatures of the filtered intensity curvature map and by summing directional intensity gradients along line segments to determine if an endplate passes through the, points; and determining if endplate positions are found by comparing relative positions of plotted values corresponding to the maximum and minimum scores.

2. The method as recited in claim 1, further comprising the step of:

performing an intensity gradient projection by determining an intensity gradient on the image of the spine in a direction orthogonal to line segments having maximum scores.

3. The method as recited in claim 2, wherein the step of performing an intensity gradient projection includes employing the intensity gradient projection to determine if the endplates are an upper endplate or a lower endplate.

4. The method as recited in claim 1, wherein the step of computing maximum and minimum scores includes the steps of:

modeling an endplate by employing a line segment between spine boundaries;

computing a co-linearity fit between the line segment and the intensity curvature map at a plurality of angular increments; and computing scores as a sum of curvatures along each line segment.

5. The method as recited in claim 1, further comprising the steps of:

confirming positions of the endplates by employing information about vertebra shapes.

6. The method as recited in claim 5, wherein the information about vertebra shapes includes, heights of vertebra and heights of inter-vertebral disks.

7. The method as recited in claim 1, wherein the step of determining if endplate positions are found by comparing relative positions of peak values corresponding to the maximum and minimum scores, includes:

providing a score function which considers minimum and maximum scores and relative positions of the peak values corresponding to the maximum and minimum scores; and determining a maximum score in accordance with the score function to determine the endplates positions.

8. The method as recited in claim 1, further comprising the step of superimposing endplate images on the image of the spine.

9. A method for detecting endplates of vertebra, comprising the steps of:

providing an image of a spine;

providing an intensity curvature map of the image of a spine;

filtering the intensity curvature map in a direction orthogonal to a spine axis;

at a plurality of points of the spine axis, computing maximum and minimum scores by summing curvatures of the filtered intensity curvature map and by summing directional intensity gradients along line segments to determine if an endplate passes through the points;

performing an intensity gradient projection by determining an intensity gradient on the image of the spine in a direction orthogonal to line segments having maximum scores; and determining endplate positions and orientations by employing relative positions of plotted values corresponding to the maximum and minimum scores and the intensity gradient projection.

10. The method as recited in claim 9, wherein the step of performing an intensity gradient projection includes employing the intensity gradient projection to determine if the endplates are an upper endplate or a lower endplate.

11. The method as recited in claim 9, wherein the step of computing maximum and minimum scores includes the steps of:

modeling an endplate by employing a line segment between spine boundaries;

computing a co-linearity fit between the line segment and the intensity curvature map at a plurality of angular increments; and computing scores as a sum of curvatures along each line segment.

12. The method as recited in claim 9, further comprising the steps of:

confirming positions of the endplates by employing information about vertebra shapes.

13. The method as recited in claim 12, wherein the information about vertebra shapes includes, heights of vertebra and heights of inter-vertebral disks.

14. The method as recited in claim 9, wherein the step of determining endplate positions and.orientations includes the steps of:

providing a score function which considers minimum and maximum scores and relative positions of the peak values corresponding to the maximum and minimum scores; and determining a maximum score in accordance with the score function to determine the endplates positions and orientations.

15. The method as recited in claim 9, further comprising the step of superimposing endplate images on the image of the spine.

16. A program storage device readable by machine, tangibly embodying a program of instructions executable by the machine to perform method steps for detecting endplates of vertebra, the method steps comprising:

providing an intensity curvature map of an image of a spine;

filtering the intensity curvature map in a direction relative to a spine axis;

at a plurality of points of the spine axis, computing maximum and minimum scores by summing curvatures of the filtered intensity curvature map and by summing directional intensity gradients along line segments to determine if an endplate passes through the points; and determining if endplate positions are found by comparing relative positions of plotted values corresponding to the maximum and minimum scores.

17. The program storage device as recited in claim 16, further comprising the step of:

performing an intensity gradient projection by determining an intensity gradient on the image of the spine in a direction orthogonal to line segments having maximum scores.

18. The program storage device as recited in claim 17, wherein the step of performing an intensity gradient projection includes employing the intensity gradient projection to determine if the endplates are an upper endplate or a lower endplate.

19. The program storage device as recited in claim 16, wherein the step of computing maximum and minimum scores includes the steps of:

modeling an endplate by employing a line segment between spine boundaries;

computing a co-linearity fit between the line segment and the intensity curvature map at a plurality of angular increments; and computing scores as a sum of curvatures along each line segment.

20. The program storage device as recited in claim 16, further comprising the steps of:

confirming positions of the endplates by employing information about vertebra shapes.

21. The program storage device as recited in claim 20, wherein the information about vertebra shapes includes, heights of vertebra and heights of inter-vertebral disks.

22. The program storage device as recited in claim 16, wherein the step of determining if endplate positions are found by comparing relative positions of peak values corresponding to the maximum and minimum scores, includes:

providing a score function which considers minimum and maximum scores and relative positions of the peak values corresponding to the maximum and minimum scores; and determining a maximum score in accordance with the score function to determine the endplates positions.

23. The program storage device as recited in claim 16, further comprising the step of superimposing endplate images on the image of the spine.

* * * * *